US012675266B2

(12) United States Patent
Lamberti et al.

(10) Patent No.: US 12,675,266 B2
(45) Date of Patent: Jul. 7, 2026

(54) COMPUTATION GRAPH COMPILING METHOD AND APPARATUS

(71) Applicant: Arm Limited, Cambridge (GB)

(72) Inventors: Derek Andrew Lamberti, Colne (UA); Aaron DeBattista, Cambridge (UA)

(73) Assignee: Arm Limited, Cambridge (GB)

( * ) Notice: Subject to any disclaimer, the term of this patent is extended or adjusted under 35 U.S.C. 154(b) by 219 days.

(21) Appl. No.: 18/422,999

(22) Filed: Jan. 25, 2024

(65) Prior Publication Data

US 2024/0256237 A1    Aug. 1, 2024

(30) Foreign Application Priority Data

Jan. 31, 2023    (GB) ...................................... 2301348

(51) Int. Cl.
*G06F 8/41*            (2018.01)
(52) U.S. Cl.
CPC .................................... *G06F 8/443* (2013.01)
(58) Field of Classification Search
CPC ....................................................... G06F 8/443
USPC ................................................. 717/140–151
See application file for complete search history.

(56) References Cited

U.S. PATENT DOCUMENTS

| | | | | |
|---|---|---|---|---|
| 7,392,516 B2 * | 6/2008 | Vasilevsky | .............. | G06F 8/445 |
| | | | | 717/157 |
| 9,727,339 B2 * | 8/2017 | Zelsnack | ................. | G06F 8/443 |

| | | | | |
|---|---|---|---|---|
| 9,830,133 B1 * | 11/2017 | Baskaran | ................ | G06F 8/453 |
| 9,858,340 B1 * | 1/2018 | Frey | ....................... | G10L 15/005 |
| 11,321,907 B1 * | 5/2022 | Dagani | ................... | G06F 8/443 |
| 11,556,756 B2 * | 1/2023 | Zhang | ................... | G06F 9/5038 |
| 11,941,507 B2 * | 3/2024 | Wang | ....................... | G06N 3/04 |
| 12,443,876 B2 * | 10/2025 | Cho | ..................... | G06F 9/4881 |
| 12,493,827 B2 * | 12/2025 | Zeng | ..................... | G06F 8/4441 |
| 12,500,910 B1 * | 12/2025 | Adamson | ............ | H04L 63/1425 |
| 2017/0255629 A1 * | 9/2017 | Thom | .................... | G06N 10/60 |
| 2018/0203673 A1 * | 7/2018 | Ravishankar | .......... | G06N 5/022 |

OTHER PUBLICATIONS

Wu et al, "GRAM: Scaling Graph Computation to the Trillions", ACM, pp. 1-14 (Year: 2015).*
Daniel at al, "Cluster-based Computation of Exact Betweenness Centrality in Large Undirected Graphs", IEEE, pp. 1-6 (Year: 2019).*
Pai et al, "A Compiler for Throughput Optimization of Graph Algorithms on GPUs", ACM, pp. 1-20 (Year: 2016).*
Lin et al, "Initialization for Network Embedding: A Graph Partition Approach", ACM, pp. 1-9 (Year: 2020).*

(Continued)

*Primary Examiner* — Anil Khatri
(74) *Attorney, Agent, or Firm* — Berkeley Law & Technology Group, LLP

(57)    ABSTRACT

A data processing apparatus for compiling computation graphs is disclosed. The apparatus includes graph partitioning circuitry that receives a computation graph, which comprises a plurality of nodes representing operators and edges representing their relationships, and divides the graph into a plurality of partitions. The apparatus also contains graph compilation circuitry and storage for compilation outputs. The graph compilation circuitry compiles a first partition to generate a first compilation output, which is then output to a first target portion of storage assigned to that first partition.

19 Claims, 4 Drawing Sheets

(56)             References Cited

OTHER PUBLICATIONS

Tian et al, "Efficient Aggregation for Graph Summarization", ACM, pp. 1-14 (Year: 2008).*

Patents Act 1977: Examination Report under Section 18(3), App. No. GB2301348.5, Mailed Jan. 15, 2025, 4 pages.

Combined Search Report under Section 17(5)(b) and Abbreviated Examination Report under Section 18(3), App. No. GB2301348.5, Mailed Aug. 2, 2023, 7 pages.

Examination Report under Section 18(3), App. No. GB2301348.5, Mailed Oct. 21, 2025, 5 pages.

* cited by examiner

Simulator Implementation

COMPUTATION GRAPH COMPILING METHOD AND APPARATUS

FIELD OF THE INVENTION

The present technology relates to machine learning systems and methods.

BACKGROUND

The advancement of machine learning models has helped make many applications, such as graphics or language applications, possible. In addition to improvements in accuracy, the capacity of these models has also greatly increased. Graph compilers have therefore been developed as a way to help manage the increased computational demand.

Generally, in a machine learning system, at the base are hardware elements that perform the computation, then, at the level above are three software elements—low-level libraries, computation graph compilers, and machine learning frameworks. The low-level libraries are typically optimized for specific hardware devices to provide implementations for neural layers of the system such as convolution, pooling, and activation. Above the libraries are graph compilers which optimize the processing of a forward or backward pass over a computation graph. In general, graph compilers compress a neural network and streamline its operations to enable it to operate more efficiently.

Many machine learning architectures may be described using a directed acyclic graph (DAG), in which a neuron is represented by a node, and where the output of one node is the input of another node, the relationship is represented by an edge (an arrow joining the two nodes). Similar to the DAG representation, nodes in a computation graph represent tensor operators and edges represent the data dependencies amongst the tensor operators.

When defining a neural network, the network may be converted to a computation graph that is then executed on the desired hardware. The complexity of a computation graph increases with the size of the network, and graph compilers are used to handle such complex computation graphs for inference on a target hardware.

SUMMARY OF THE INVENTION

In view of the foregoing, an aspect of the present technology provides a data processing apparatus, comprising: graph partitioning circuitry configured to receive a computation graph, the computation graph comprising a plurality of nodes representing operators and a plurality of edges representing relationships amongst the plurality of operators, and to divide the computation graph into a plurality of partitions, each comprising one or more nodes and/or edges; graph compilation circuitry configured to compile a computation graph to generate one or more compilation outputs; and storage to store the one or more compilation outputs; wherein the graph compilation circuitry is configured to: compile a first partition of the plurality of partitions to generate a first compilation output; and output the first compilation output to a first target portion of the storage assigned to the first partition.

According to embodiments of the present technology, a computation graph is divided (partitioned) into a plurality of partitions, then the computation graph is compiled as individual partitions. The partitioning is done in such a way that each partition can be compiled independently, and once compiled, the compilation output can be queued for execution without having to wait for compilation of the whole graph to complete. In doing so, the time to first inference is no longer limited by the time required to compile the whole graph, but only limited by the compilation time of a partition to be compiled first. Embodiments of the present technology thus enable the time to first inference to be reduced.

In some embodiments, the graph compilation circuitry may be configured to compile a second partition of the plurality of partitions to generate a second compilation output in parallel with the first partition. It would be clear to a skilled person that more than two partitions may be compiled in parallel if desired.

In some embodiments, the graph compilation circuitry may compile a partition of the plurality of partitions by applying a scheduling algorithm to the partition to generate a schedule, wherein the scheduling algorithm may be configured to determine one or more data processing operations based on the one or more nodes and/or edges and to assign the one or more data processing operations to the execution circuitry in the schedule.

In some embodiments, the graph partitioning circuitry may divide the computation graph into a plurality of partitions by applying a partitioning algorithm, wherein the partitioning algorithm may be configured to divide the computation graph into a plurality of partitions based on one or more partition objectives and assign a target portion of the storage to at least one of the plurality of partitions. The partitioning of a computation graph can differ between graphs, and the plurality of partitions within a graph can be of different shapes and/or sizes. To ensure appropriate partitioning of a computation graph, a partitioning algorithm is applied to divide the graph into a plurality of partitions based on one or more objectives. In doing so, partitioning can be performed appropriately and consistently across multiple computation graphs.

In some embodiments, the one or more partition objectives may comprise dividing the computation graph into a plurality of partitions based on optimizing the target portion of the storage with respect to a size of a compilation output of the at least one of the plurality of partitions assigned thereto. The output, e.g. operation scheduling and assignment, generated when a partition is compiled is stored in a target portion of storage and queued for execution. The partitioning algorithm may be configured to partition a computation graph according to an objective of optimising storage use, such that the compilation output of a partition is stored in a target portion of the storage that is substantially optimal for (e.g. the size of) this compilation output.

In some embodiments, the one or more partition objectives may comprise dividing the computation graph into a plurality of linear partitions each comprising only nodes of a linear topology. By implementing such a linearity objective, it is possible to reduce, or altogether avoid, creating branched partitions that comprise nodes with branches and/or residual connections, which would lead to these branch partitions being dependent on one or more other partitions, or one or more other partitions being dependent on these branched partitions. In other words, such a linearity objective facilitates the division of a computation graph into a plurality of individual partitions capable of being compiled independently. It should be noted that in embodiments where a linear objective is not imposed on partitioning, which is within the scope of the present technology, while branched partitions may be more complex, the graph compilation circuitry would be capable of supporting branched partitions.

While it is generally preferable to allow a computation graph to be divided into a plurality of different shapes and/or sizes partitions depending on a partition objective, there may be instances when dividing a computation graph into a plurality of same shape and/or size partitions is desirable. Thus, in some embodiments, the one or more partition objectives may comprise dividing the computation graph into a plurality of same size and/or same shape partitions.

In some embodiments, the apparatus may further comprise execution circuitry configured to execute the one or more compilation outputs, wherein the execution circuitry is configured to execute the first compilation output upon the first target portion of the storage receiving the first compilation output.

In some embodiments, the graph compilation circuitry may be configured to compile a second partition of the plurality of partitions to generate a second compilation output while the execution circuitry executes the first compilation output, and to output the second compilation output to a second target portion of the storage assigned to the second partition. Since the computation graph is divided into partitions, it is possible to compile more than one partitions in parallel, and/or to execute the output of one partition while another partition is being compiled. Herein, the notations "first" and "second" need not signify a specific order, but simply as a way of differentiating between different like elements. It is not essential, according to embodiments of the present technology, to compile the plurality of partitions in any particular order. However, in an embodiment, the plurality of partitions may be compiled in the order in which they are arranged within the computation graph, and in doing so, the compilation outputs of the plurality of partitions may be executed in order. Thus, in this embodiment, the second partition may refer to a partition that is subsequent to the first partition.

There may sometimes be more than one compilation methods for compiling a partition, and it may be possible for the compilation of a partition to sometimes generate different compilation outputs. The compilation method used or the compilation output generated may both impact on performance, for example compilation time, execution time, inference time, etc., and/or bandwidth usage. It may therefore be useful to generate performance feedback for the compilation output of some (or all) of the plurality of partitions, and the performance feedback may for example be used to fine-tune graph compilation, such as to improve inference time and/or bandwidth usage. Thus, in some embodiments, the execution circuitry may be configured to collect performance statistics with respect to one or more of the plurality of partitions and/or a compilation output of the one or more of the plurality of partitions, and to feedback the collected performance statistics to the graph partitioning circuitry and/or the graph compilation circuitry.

In some embodiments, the performance statistics may comprise, with respect to one or more of the plurality of partitions and/or a compilation output of the one or more of the plurality of partitions, a compiling time, an execution time, an inference time, a bandwidth usage, or a combination thereof.

In some embodiments, the graph partitioning circuitry is configured to adjust the dividing the computation graph into a plurality of partitions based on the collected performance statistics to reduce a compiling time, an execution time, an inference time, or a combination thereof; and/or the graph compilation circuitry is configured to adjust the compiling a partition of the plurality of partitions to generate a compilation output based on the collected performance statistics to reduce a compiling time, an execution time, an inference time, or a combination thereof. Implementation of these embodiments enables a "performance tuning mode" that configures the execution circuitry to feedback, to the graph compilation circuitry, performance statistics (e.g. inference time) with respect to compilation outputs generated from the compilation of individual partitions. The tuned compilation output for a computation graph may for example be stored to memory. In addition, or alternatively, the tuned compilation output of individual partitions may for example be stored in memory, and may for example be used in the compilation of the same computation graph or different computation graphs that comprise some of the same elements. According to the present approach, the granularity of changes to the compilation output of a computation graph is at the partition level, allowing finer tuning to be performed.

The execution circuitry may be configured to continue feeding back performance statistics and the graph compilation circuitry may be configured to continue fine-tuning the partitioning and/or the partition compiling until optimal (or substantially optimal) performance is reached. However, there may be circumstances when this is unnecessary or undesirable. Thus, in some embodiments, the graph partitioning circuitry and/or the graph compilation circuitry may be configured to terminate the adjusting when a predetermined elapsed time is reached, when a predetermined proportion of search space is covered, and/or when a predetermined performance threshold is reached for one or more of the plurality of partitions and/or a compilation output of the one or more of the plurality of partitions.

Another aspect of the present technology provides a method comprising: receiving a computation graph, the computation graph comprising a plurality of nodes representing operators and a plurality of edges representing relationships amongst the plurality of operators; dividing the computation graph into a plurality of partitions, each comprising one or more nodes and/or edges; compiling a computation graph to generate one or more compilation outputs, wherein compiling a computation graph comprises: compiling a first partition of the plurality of partitions to generate a first compilation output; and outputting the first compilation output to a first target portion of the storage assigned to the first partition; and storing the one or more compilation outputs in storage.

A further aspect of the present technology provides a computer program comprising instructions for controlling a host data processing apparatus to provide an instruction execution environment comprising: graph partitioning program logic configured to receive a computation graph, the computation graph comprising a plurality of nodes representing operators and a plurality of edges representing relationships amongst the plurality of operators, and to divide the computation graph into a plurality of partitions, each comprising one or more nodes and/or edges; graph compilation program logic configured to compile a computation graph to generate one or more compilation outputs; and storage to store the one or more compilation outputs; wherein the graph compilation program logic is configured to: compile a first partition of the plurality of partitions to generate a first compilation output; and output the first compilation output to a first target portion of the storage assigned to the first partition.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which.

DETAILED DESCRIPTION

Figure 1:
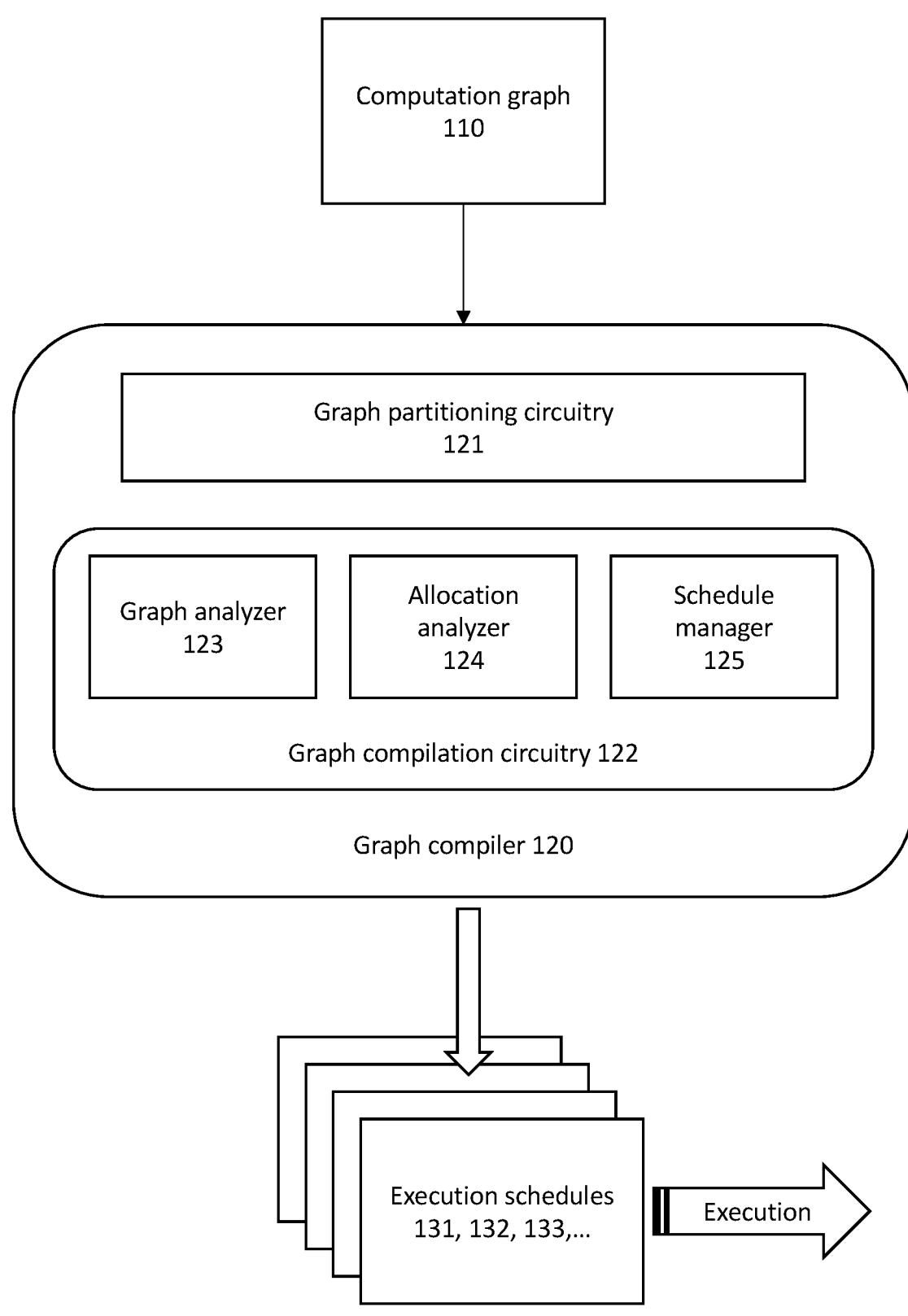
FIG. 1 shows an exemplary operating environment for a computation graph compiler to generate compilation outputs for a computation graph.

Generally, graph compilers map the high-level computation graph generated by machine learning frameworks to operations that are executable on a hardware device. When compiling a computation graph or mapping the computation graph to a target hardware device, a graph compiler may apply one or more optimizations to facilitate inference on the target hardware device. Typical graph compiler optimizations may for example include graph rewriting, operation fusion, assignment of operations to hardware primitives, kernel synthesis, amongst other things.

The structure of a computation graph determines the order in which operations are to be executed to compute an output. Job scheduling is implemented to determine an order in which a sequence of operations are to be executed. Graph rewriting uses one or more degrees of freedom in a computation graph to facilitate improved job scheduling when executing a forward pass in a neural network. There are one or more actions that may be applied to a computation graph in some instances to improve operation scheduling without affecting (or with little effect on) the operation result. These actions may for example include deleting or adding a node or an edge, merging two or more nodes, cloning or replacing one subgraph with another, etc. Under certain circumstances, a graph compiler may remove one or more layers that generate unused outputs.

There may be instances when a computational graph comprises a sequence of operation (or more) that are common, or a sequence (or more) for which a specific hardware kernel exists. In operation fusion, a graph compiler may for example fuse operations belonging to such a sequence such that these operations may be processed in a single step so as to reduce unnecessary memory accesses.

Graph compilers are implemented to determine the assignment of operations to target hardware, in particular when inference takes place on multiple hardware devices. Operations may be scheduled based on one or more different objectives/policies. In a multi-device setting, as part of the scheduling strategy, each device may maintain a queue of operations awaiting execution. In this case, the order of the operations in the queue may affect the overall runtime, and a graph compiler may be configured to optimize runtime through operation scheduling and assignment. Further, graph compilers may be implemented to optimize the execution of the nodes, for example by optimizing the memory access patterns and/or increasing memory locality within storage units close to processing units. Implementation of graph compilers may help to maximize the utilization of the processing units.

In conventional approaches, a graph compiler compiles a computation graph as a single process to return a fully compiled and optimised stream of scheduled instructions, before these instructions are executed. In order to improve time-to-first-inference (TTFI), in some implementations, graph compilation may be performed asynchronously in the background. However, compilation of the entire graph must be completed before execution, and therefore first inference, can begin. In these implementations, if the compilation of any portion of a computation graph is not complete, then execution is blocked until all compiled output is ready (operation scheduling for the whole graph is complete). In addition, or in alternative implementations, a rough compilation of a computation graph can be performed to reduce the time to execution, and then a more optimal compilation may be performed to replace the rough compilation while the rough compilation is being executed. However, execution of the rough compilation can suffer from slower or less efficient performance.

According to conventional approaches, execution (and therefore inference) can only begin when the compilation of an entire computation graph is complete, and all operations are scheduled. Even when faster compilation may be achieved through asynchronous compilation and/or rough compilation, execution, and inference, time is still limited by the time required to compile the whole computation graph.

There is therefore scope for improvements in methods and systems for computation graph compilation.

According to embodiments of the present technology, a computation graph is divided, or partitioned, into a plurality of partitions, then the computation graph is compiled on a partition-by-partition basis. The computation graph is partitioned in such a way that each partition can be compiled separately from other partitions, and once compiled, the compilation output of a partition can be queued for execution and be executed without having to wait for compilation outputs from all remaining partitions of the computation graph. In doing so, the time to first inference is not limited by the time required to compile the whole computation graph; instead, time to first inference becomes the time it takes to compile the first partition. Embodiments of the present technology thus enable the time to first inference to be reduced.

The techniques described herein may be implemented within a data processing apparatus that comprises hardware circuitry provided for implementing the instruction decoder and processing circuitry described herein.

Alternatively, the present techniques may be implemented within a computer program that executes on a host data processing apparatus (e.g. a CPU) to provide an instruction execution environment for execution of target code. Such a computer program may control the host data processing apparatus to simulate the architectural environment that would be provided on a target data processing apparatus which supports the target code, even if the host data processing apparatus itself does not support that architecture.

For example, the computer program may comprise instruction decoding program logic that decodes program instructions of the target code to control the host data processing apparatus to perform data processing in response to the program instructions (e.g. mapping each instruction of the target code to a sequence of one or more instructions in the native instruction set of the host which implements equivalent functionality). The computer program may have storage emulating program logic that maintains a data structure in host storage of the host data processing apparatus to emulate the storage of the data processing apparatus being simulated. The computer program may further have graph compilation program logic that compiles a computation graph to generate one or more compilation outputs to emulate the graph compilation circuitry being simulated. In such an implementation, the graph compilation program logic may output compilation outputs to assigned target portions in the storage as described above, but in this example references to individual target portions assigned to corresponding partitions may be mapped to corresponding locations of the storage emulating data structure stored in the host storage.

FIG. 1 shows an exemplary operating environment for a computation graph compiler 120 to generate one or more compilation outputs such as one or more execution schedules 131, 132, 133, . . . based on a computation graph 110. The computation graph 110 may comprise a plurality of nodes representing operators and a plurality of edges representing relationships amongst the plurality of operators. Scheduling, or the generation of schedules, is a method by which work is assigned to resources that complete the work. The work may be divided into tasks, such as virtual computation elements (e.g. threads, processes, or data flows), which are in turn scheduled onto hardware resources, such as processors, network links, or expansion cards. Tasks are often scheduled according to an execution schedule. An execution schedule may define the order to execute tasks to complete work, and may be generated based on dependencies and/or resource requirements of the tasks.

In the present example, the graph compiler 120 comprises graph partitioning circuitry 121 and graph compilation circuitry 120. The graph partitioning circuitry 121 is configured to receive the computation graph 110 and divide the computation graph 110 into a plurality of partitions. Each of the plurality of partitions of the computation graph 110 comprises one or more nodes and/or edges. The partitioning of a computation graph is performed by application of a partitioning algorithm according to one or more partitioning objectives. These will be described further below.

The graph compilation circuitry 122 is configured to compile the computation graph 110 to generate one or more compilation outputs, such as one or more execution schedules 131, 132, 133, . . . . The one or more compilation outputs are written to appropriate storage or portions of storage (memory levels), such as quick access storage, which are then queued for execution. In particular, according to the embodiments, the graph compilation circuitry 122 is configured to process individual partitions to generate separate compilation outputs for respective partitions. Each compilation output of a partition can be output as and when it is ready to a target portion of the storage that is assigned to that partition.

As an example, the graph compilation circuitry 122 comprises graph analyzer 123 that analyses each partition of the computation graph 110, e.g. to determine dependencies and/or resource requirements, allocation analyzer 124 that allocates tasks to appropriate resources, and schedule manager 125 that schedules the tasks.

In one or more embodiments described herein, the components/elements of the graph compiler 120 may interoperate to generate execution schedules 131, 132, 133, . . . based on the computation graph 110. It will be appreciated that the graph compiler 120 and the components thereof are used in conjunction with the embodiments described herein; however, the functionalities, techniques, capabilities, etc. of elements of the embodiments described herein may be implemented with additional and/or different components as desired.

According to the approach of the present technology, a graph compiler divides a computation graph into a plurality of partitions, compiles each partition and outputs an execution schedule (compilation output) for each partition. The partitioning is performed according to a partitioning algorithm which ensures each partition can be compiled separately from each other. In doing so, it also enables multiple partitions to be compiled in parallel. When the compilation of a partition is completed, an execution schedule for that partition outputted by the graph compiler can proceed to runtime while other remaining partitions are being compiled in the meantime. Through implementation of the embodiments, it is possible for runtime to begin execution of a compiled partition without having to wait for the compilation of the whole computation graph to complete. Thus, time to first inference becomes the time it takes to compile a partition instead of the whole computation graph, and inference time is therefore reduced.

In some embodiments, the graph compiler may be configured to compile a partition based on a crude search of the schedule space and to output a crude execution schedule for the partition. The crude execution schedule is returned to runtime to be executed. The graph compiler may be configured to continue searching the schedule space while the crude execution schedule is being executed or at a later point to output a more optimal execution schedule, and the crude execution schedule can be replaced when a more optimal schedule is output. A crude search is expected to be quicker than a more thorough search to output the more optimal execution schedule, and so it is possible to reduce inference time further. The process of executing a less optimal schedule while searching the schedule space to output a more optimal schedule can be repeated for a partition to output progressively more optimal execution schedules during runtime. The graph compiler may be configured to continue such iterative schedule update until one or more predetermined termination criteria are reached. For example, the termination criteria may include a) a predetermined performance threshold is reached by the execution schedule(s) of a predetermined number or proportion of partitions; b) a predetermined elapsed time has passed; or c) a predetermined proportion of search space has been searched. It should be appreciated that the termination criteria above are merely examples of what is possible; fewer or more conditions may be set which may be similar to or differ from the examples given above. The graph compiler may be configured to perform such iterative schedule update on a per-partition basis, in which the iterative schedule update for a partition can be executed in its own thread. In doing so, schedule update can be scalable in that the number or proportion of partitions to undergo schedule updating can vary depending e.g. on available resources.

A non-limiting example will now be given for the purpose of illustrating the principles of the present technology. In the example, a computation graph is divided into n partitions. Compilation of the n partitions may be performed asynchronously. For example, partition 0 may be compiled in parallel with partition 1. When the compilation of partition 0 is completed, the graph compiler returns execution schedule 0 generated from compiling partition 0 to runtime and execution schedule 0 is executed while the compilation of partition 1 continues. Thus, inference begins when the compilation of partition 0 is completed. Since the compilation of partition 0 is completed, the compilation of partition 2 can begin in parallel with the compilation of partition 1. While it is possible to compile the plurality of partitions out of order, e.g. to compile partitions 0 in parallel with partition 3, it may be preferable to execute the execution schedules generated by the compilation of the partitions in order (in accordance with the topological sort of the DAG). Thus, it may be in some embodiments be preferable to compile the partitions in the order in which they are arranged within the computation graph for improved efficiency.

Partitions of a computation graph need not have the same shape and/or sizes; a computation graph may be divided into partitions of different shapes and/or sizes as desired, and the partitioning of one computation graph may differ from the partitioning of another computation graph. The size of a partition and the memory architecture of the target portion of storage to which the compilation output of the partition is written may be interdependent. For example, a portion of storage may be assigned to a particular partition if it is determined that that portion of storage represent a substantially optimal use of storage space based on the size of the compilation output generated from the particular partition. Thus, in some embodiments, memory locations may be specifically selected for optimal placement of different partitions. In particular, the graph partitioning circuitry 121 may be configured to apply a partitioning algorithm to a computation graph according to one or more partitioning objectives. One such partitioning objective may be to divide a computation graph into partitions where, for each partition, the input and output(s) of the partition are assigned and stored in a memory level (a target portion of storage) that is substantially optimal and (physically or logically) close to the relevant processing core(s) to reduce further scheduling search. Another such partitioning objection may be to divide a computation graph into partitions that follow a specific topology, an example being dividing a computation graph into a plurality of linear partitions each comprising only a linear topology of nodes, and/or minimizing, avoiding or eliminating branched partitions that comprise nodes with branches and residual connections.

Figure 2:
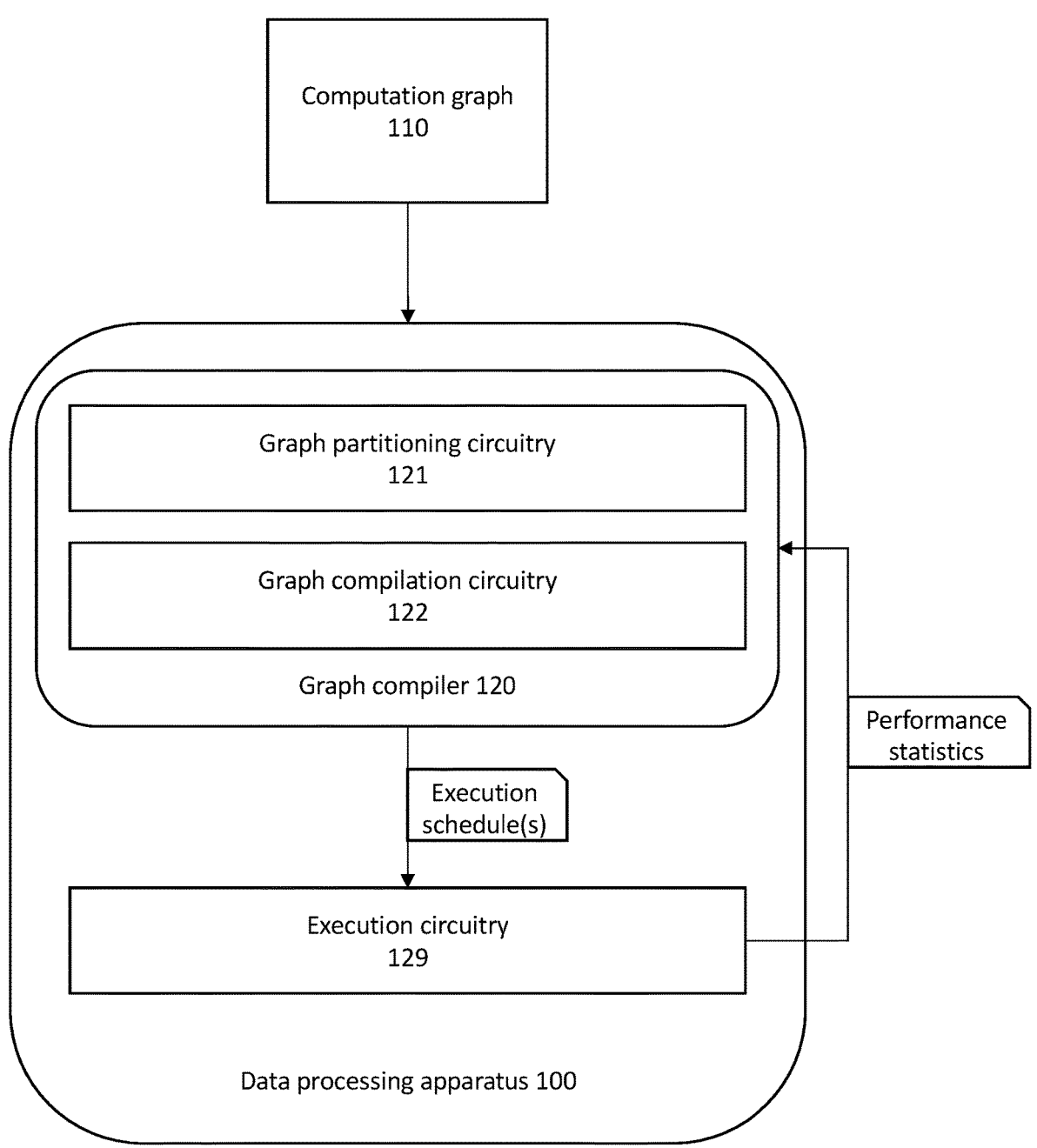
FIG. 2 shows an exemplary operating environment for a data processing apparatus to process a computation graph.

FIG. 2 shows an exemplary an operating environment for a data processing apparatus 100 to process the computation graph 110. The data processing apparatus 100 comprises the graph compiler 120, which in turn comprises the graph partitioning circuitry 121 and graph compilation circuitry 122 as described above. The data processing apparatus 100 further comprises execution circuitry 129. The execution circuitry 129 may be implemented, in different embodiments, as one or more hardware resources, and while the execution circuitry 129 is shown herein as part of the data processing apparatus 100, it needs not be the case; the one or more hardware resource may instead be external to the data processing apparatus 100 and in communication with the data processing apparatus 100 via appropriate communication channel(s).

The graph partitioning circuitry 121 and graph compilation circuitry 122 have been described above and will not be repeated here. One or more execution schedules output by the graph compiler 120 and written to respective assigned storage are queued for execution by the execution circuitry 129, which performs the processing tasks scheduled in the respective execution schedules. In the present example, the execution circuitry is further configured to collect performance statistics, for example with respect to execution schedules generated from different partitions and/or to different versions of execution schedule generated from the same partition, which are fed back to the graph compiler 120.

The Applicant has recognized that the different ways in which a computation graph is partitioned, or a partition is compiled, and different execution schedules (compilation outputs) generated from the same partition can impact on performance, such as compilation time, execution time, inference time, and/or bandwidth usage. Thus, in the present example, performance statistics may be generated and/or collected for the execution schedules of at least some (or all) of the compiled partitions and feedback to the graph compiler 120, such that graph compilation for the current computation graph and/or future computation graphs may be optimized with respect to e.g. inference time or bandwidth usage. For example, performance statistics of each iteration of execution scheduled generated from a partition based on progressively more thorough searches may be collected and fed back to the graph compiler 120 to inform the graph compiler 120 whether an optimal execution schedule, or an execution schedule meeting a predetermined performance threshold, is reached. Moreover, performance statistics of execution schedules output by the graph compiler 120 may be analyzed to find one or more schedules that result in more optimal performance (e.g. faster or fastest first inference). Since there may be multiple compilation solutions for a particular partition within the search space, analyzing the feedback for each solution may facilitate quicker searches to arrive at an optimal solution with fewer iterations for future computation graphs.

In such a "performance tuning mode", the execution circuitry 129 may feedback to the graph compiler 120 performance statistics such as inference times with respect to execution schedules generated from one or more individual partitions. Then the "tuned" compilation outputs for one or more partitions may be stored in memory e.g. when a desired performance threshold has been reached. According to the present approach, the granularity of changes to execution schedules is at partition level rather than full computation graph level. Further, the tuned compilation outputs for individual partitions may be stored for future use to reduce search time when the computation graph is used.

Figure 3:
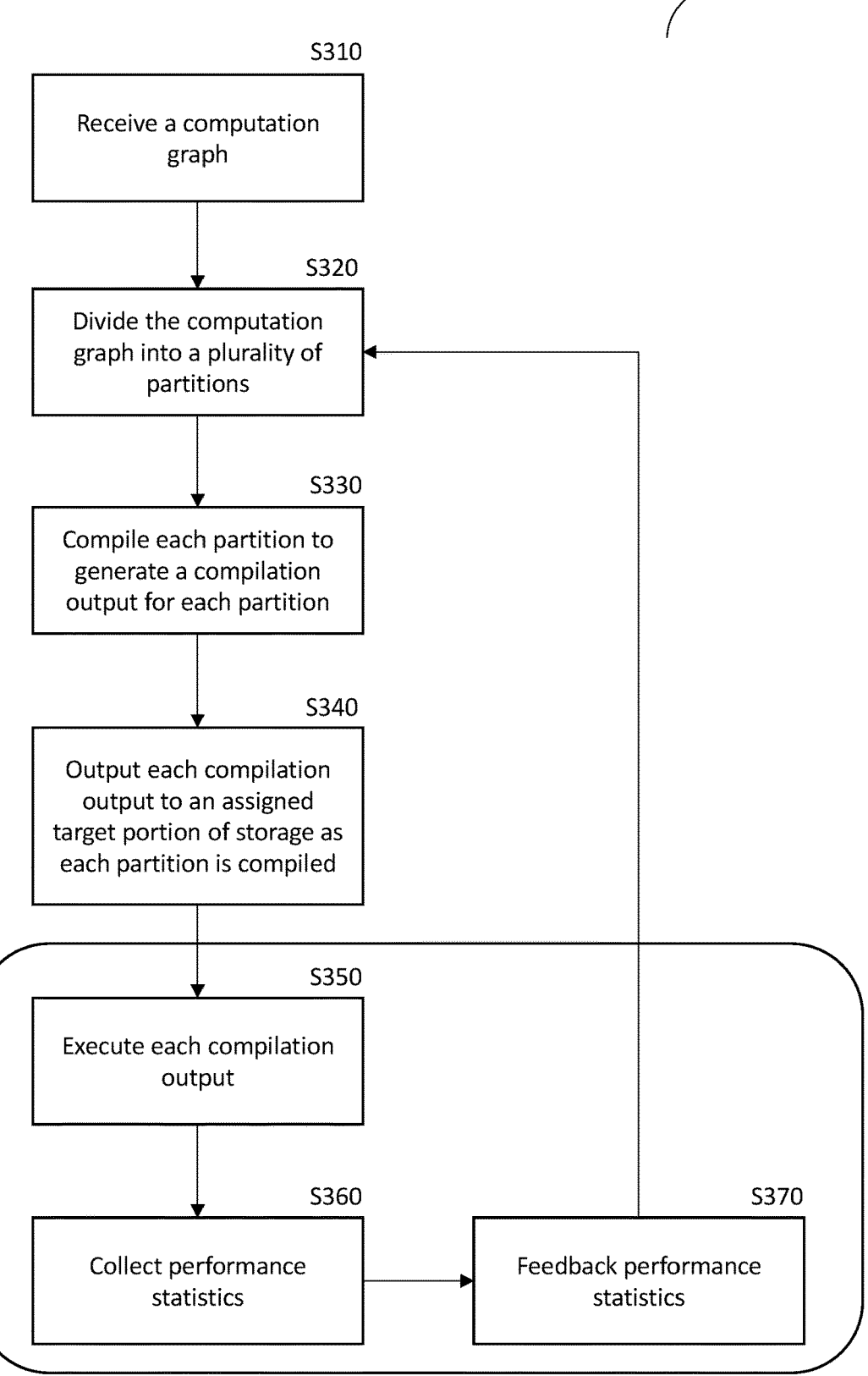
FIG. 3 shows a flow diagram of an exemplary method of compiling a computation graph.

FIG. 3 shows a flow diagram of an exemplary method of compiling and processing a computation graph.

The method 300 beings at S310, at which a computation graph is received, e.g. by a graph compiler as described above.

At S320, the computation graph is divided into a plurality of partitions, wherein each partition comprises one or more nodes and/or edges. In particular, the computation graph is divided into a plurality of partitions using a partitioning algorithm, which divides the computation graph based on one or more partition objectives and assign a target portion of storage to each of the plurality of partitions. For example, the one or more partition objectives may include dividing the computation graph into a plurality of partitions based on optimizing the storage for the size of a compilation output of each partition, and/or dividing the computation graph into a plurality of linear partitions each comprising only nodes of a linear topology.

At S330, the computation graph is compiled to generate one or more compilation outputs. In particular, individual partitions are compiled, one at a time or two or more in parallel, to generate respective compilation outputs, and a compilation output is written to a target portion of the storage assigned to the partition from which the compilation output is generated at S340. In particular, a partition is compiled by applying a scheduling algorithm to the partition to generate an execution schedule. The scheduling algorithm determines one or more data processing operations or tasks based on the one or more nodes and/or edges comprised in a partition, and assigns the one or more data processing operations or tasks in an execution schedule assigned to an appropriate hardware resource (execution circuitry).

At S350, the one or more compilation outputs written to respective target portions of the storage are queued and executed by the assigned hardware resource(s). In particular, upon a first compilation output, generated from compiling a first partition, being written to the assigned target portion of the storage, the first compilation output can be queued and executed. Thus, inference begins when the compilation of the first partition is completed.

Optionally, in some embodiments, performance statistics may be collected at S360 with respect to one or more partitions and/or a compilation output of one or more partitions. Such performance statistics may include, with respect to one or more partitions and/or a compilation output of one or more of partitions, a compiling time, an execution time, an inference time, a bandwidth usage, or a combination thereof.

Optionally, at S370, the performance statistics are fed back, e.g. to the graph compiler, and the method returns to S320. Based on the collected performance statistics, the graph compiler may adjust, tune or optimise the partitioning of the computation graph to reduce a compiling time, an execution time, an inference time, and/or a bandwidth usage. Alternatively, or in addition, based on the collected performance statistics, the graph compiler may adjust, tune or optimise the compilation of a partition to generate a compilation output with reduced compiling time, execution time, inference time, and/or bandwidth usage. The graph compiler may use the performance statistics to adjust, tune or optimise the compilation of upcoming partitions of the same computation graph, to adjust, tune or optimise the partitioning and/or the compilation of a subsequent computation graph, or to re-compile the same graph with modified parameters. The adjustment, tuning or optimisation may be terminated when a predetermined elapsed time is reached, when a predetermined proportion of search space is covered, and/or when a predetermined performance threshold is reached for one or more partitions and/or a compilation output of the one or more partitions.

Figure 4:
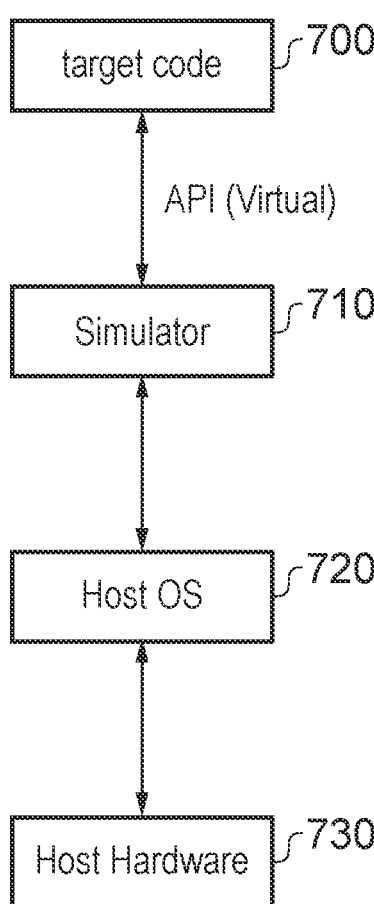
FIG. 4 shows an exemplary simulator for implementing embodiments of the present technology.

In a further embodiment, FIG. 4 illustrates a simulator implementation of the present technology. Whilst the earlier described embodiments implement the present technology in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory storage medium), and provides a program interface (instruction execution environment) to target code 700 which is the same as the application program interface of the hardware architecture being modelled by the simulator program 710. Thus, the program instructions of the target code 700, such as the method 300 described above, may be executed from within the instruction execution environment using the simulator program 710, so that a host computer 730 which does not actually have the hardware features of the apparatus discussed above can emulate these features.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A data processing apparatus, comprising:
graph partitioning circuitry configured to receive a computation graph, the computation graph comprising a plurality of nodes representing a plurality of operators and a plurality of edges representing relationships amongst the plurality of operators, and to divide the computation graph into a plurality of partitions, each partition comprising one or more nodes and/or edges;
a graph compiler comprising graph compilation circuitry configured to compile a computation graph to generate one or more compilation outputs;
storage to store the one or more compilation outputs; and
execution circuitry configured to execute the one or more compilation outputs;
wherein the graph compilation circuitry is configured to:
compile a first partition of the plurality of partitions to generate a first compilation output; and
output the first compilation output to a first target portion of the storage assigned to the first partition; and
wherein the execution circuitry is configured to:
collect performance statistics with respect to one or more of the plurality of partitions and/or a compilation output of the one or more of the plurality of partitions, and to feedback the collected performance statistics to the graph partitioning circuitry and/or the graph compilation circuitry.

2. The apparatus of claim 1, wherein the graph compilation circuitry is configured to compile a second partition of the plurality of partitions to generate a second compilation output in parallel with the first partition.

3. The apparatus of claim 1, wherein the graph compilation circuitry compiles a partition of the plurality of partitions by applying a scheduling algorithm to the partition to generate a schedule, wherein the scheduling algorithm is configured to determine one or more data processing operations based on the one or more nodes and/or edges and to assign the one or more data processing operations to the execution circuitry in the schedule.

4. The apparatus of claim 1, wherein the graph partitioning circuitry divides the computation graph into a plurality of partitions by applying a partitioning algorithm, wherein the partitioning algorithm is configured to divide the computation graph into a plurality of partitions based on one or more partition objectives and assign a target portion of the storage to at least one of the plurality of partitions.

5. The apparatus of claim 4, wherein the one or more partition objectives comprise dividing the computation graph into a plurality of partitions based on optimizing the target portion of the storage with respect to a size of a compilation output of the at least one of the plurality of partitions assigned thereto.

6. The apparatus of claim 4, wherein the one or more partition objectives comprise dividing the computation graph into a plurality of linear partitions each comprising only nodes of a linear topology.

7. The apparatus of claim 4, wherein the one or more partition objectives comprise dividing the computation graph into a plurality of same size and/or same shape partitions.

8. The apparatus of claim 1, wherein the execution circuitry is configured to execute the first compilation output upon the first target portion of the storage receiving the first compilation output.

9. The apparatus of claim 8, wherein the graph compilation circuitry is configured to compile a second partition of the plurality of partitions to generate a second compilation output while the execution circuitry executes the first compilation output, and to output the second compilation output to a second target portion of the storage assigned to the second partition.

10. The apparatus of claim 1, wherein the performance statistics comprises, with respect to one or more of the plurality of partitions and/or a compilation output of the one or more of the plurality of partitions, a compiling time, an execution time, an inference time, or a combination thereof.

11. The apparatus of claim 1, wherein:

the graph partitioning circuitry is configured to adjust division of the computation graph into a plurality of partitions based on the collected performance statistics to reduce a compiling time, an execution time, an inference time, or a combination thereof; and/or the graph compilation circuitry is configured to adjust compilation of a partition of the plurality of partitions to generate a compilation output based on the collected performance statistics to reduce a compiling time, an execution time, an inference time, or a combination thereof.

12. The apparatus of claim 11, wherein the graph partitioning circuitry and/or the graph compilation circuitry is configured to terminate the adjustment of division of the computation graph into the plurality of partitions when a predetermined elapsed time is reached, when a predetermined proportion of search space is covered, and/or when a predetermined performance threshold is reached for one or more of the plurality of partitions and/or a compilation output of the one or more of the plurality of partitions.

13. A method comprising:

receiving a computation graph, the computation graph comprising a plurality of nodes representing a plurality of operators and a plurality of edges representing relationships amongst the plurality of operators;

dividing the computation graph into a plurality of partitions, each partition comprising one or more nodes and/or edges;

compiling, at a graph compiler, a computation graph to generate one or more compilation outputs;

storing the one or more compilation outputs in storage; and executing the one or more compilation outputs, wherein compiling a computation graph comprises:

compiling a first partition of the plurality of partitions to generate a first compilation output; and outputting the first compilation output to a first target portion of the storage assigned to the first partition; and wherein executing the one or more compilation outputs comprises:

collecting performance statistics with respect to one or more of the plurality of partitions and/or a compilation output of the one or more of the plurality of partitions, and to feedback the collected performance statistics to the dividing the computation graph and/or the computation graph compiling.

14. The method of claim 13, further comprising compiling a second partition of the plurality of partitions to generate a second compilation output in parallel with the first partition.

15. The method of claim 13, wherein compiling a partition of the plurality of partitions comprises applying a scheduling algorithm to the partition to generate a schedule, wherein the scheduling algorithm is configured to determine one or more data processing operations based on the one or more nodes and/or edges and to assign the one or more data processing operations to execution circuitry in the schedule.

16. The method of claim 13, wherein dividing the computation graph into a plurality of partitions comprises applying a partitioning algorithm, wherein the partitioning algorithm is configured to divide the computation graph into a plurality of partitions based on one or more partition objectives and assign a target portion of the storage to at least one of the plurality of partitions.

17. The method of claim 16, wherein the one or more partition objectives comprise dividing the computation graph into a plurality of partitions based on optimizing the target portion of the storage with respect to a size of a compilation output of the at least one of the plurality of partitions assigned thereto.

18. A non-transitory data carrier carrying code which, when implemented on a processor, causes the processor to carry out the method of claim 13.

19. A non-transitory computer-readable medium comprising instructions for controlling a host data processing apparatus to provide an instruction execution environment comprising:

graph partitioning program logic configured to receive a computation graph, the computation graph comprising a plurality of nodes representing a plurality of operators and a plurality of edges representing relationships amongst the plurality of operators, and to divide the computation graph into a plurality of partitions, each partition comprising one or more nodes and/or edges;

a graph compiler comprising graph compilation program logic configured to compile a computation graph to generate one or more compilation outputs;

storage to store the one or more compilation outputs; and execution circuitry configured to execute the one or more compilation outputs;

wherein the graph compilation program logic is configured to:

compile a first partition of the plurality of partitions to generate a first compilation output; and output the first compilation output to a first target portion of the storage assigned to the first partition; and wherein the execution circuitry is configured to:

collect performance statistics with respect to one or more of the plurality of partitions and/or a compilation output of the one or more of the plurality of partitions, and to feedback the collected performance statistics to the graph partitioning program logic and/or the graph compilation program logic.

* * * * *